United States Patent [19]

Wang

[11] Patent Number: 4,792,293

[45] Date of Patent: Dec. 20, 1988

[54] AIR PUMP ASSEMBLY FOR A FISH BOWL

[75] Inventor: Chiao-Ming Wang, Taichung Hsien, Taiwan

[73] Assignee: Meiko Pet Corporation, Taichung Hsien, Taiwan

[21] Appl. No.: 98,947

[22] Filed: Sep. 21, 1987

[51] Int. Cl.⁴ .................. F04B 39/10; F04B 45/00
[52] U.S. Cl. ........................... 417/571; 417/413
[58] Field of Search ............ 417/413, 564, 566, 571, 417/363

[56] References Cited

U.S. PATENT DOCUMENTS

| | | | |
|---|---|---|---|
| 2,788,170 | 4/1957 | Kato et al. | 417/413 |
| 3,635,598 | 1/1972 | Sieper | 417/571 |
| 3,825,374 | 7/1974 | Kondo | 417/413 |
| 3,981,636 | 9/1976 | Aoki et al. | 417/566 |
| 4,180,377 | 12/1979 | Itakura | 417/413 |
| 4,608,000 | 8/1986 | Tominaga | 417/413 |

FOREIGN PATENT DOCUMENTS 333773 12/1958 Switzerland ............. 417/571

Primary Examiner—Paul F. Neils
Attorney, Agent, or Firm—Bacon & Thomas

[57] ABSTRACT

An air pump assembly including a one-piece pump stock provided with a base portion defining a first recess for receiving a rubber cushion, the pump stock being attached to an interior wall of a pump casing by securing the base portion within a second recess formed on the interior wall by opposed inwardly directed flanges.

2 Claims, 1 Drawing Sheet

B-B

FIG.4·A

AIR PUMP ASSEMBLY FOR A FISH BOWL

BACKGROUND OF THE INVENTION

The present invention relates to an improved structure of pump stock of air pump used in fish bowl.

Prior bolt-connected two-piece structured pump stock, such as that disclosed in Taiwan Patent No. 73489, usually has following defects:

(1) The upper part and the lower part are assembled by screwing bolts through threaded holes while a rubber plate is placed between the two parts. Since the lower part is made of plastic material, the strength of the threaded holes is inevitably limited by the nature of its material. The bolts are made of metal which will easily damage the threads on the bolts if the worker fails to screw them accurately and perpendicularly into the threaded holes, thereby requiring removal and retightening of the bolts. Frequently, a considerable gap will result between the thread of hole and the bolt. Since the bolts will eventually become more loosely attached to the threads of the holes, both the upper part and the lower part of the pump stock will, under the vibration caused by the induction of the electromagnet, gradually be unable to tightly attach themselves to the rubber plate. The leakage of air from the resulting gap between the elements will deteriorate the entire function of the air pump accordingly.

(2) Besides, to assemble the upper and the lower parts and the rubber plate by screwing bolts through threaded holes will relatively increase the labour and cost in pump production and die-making process, thereby causing a negative influence on productivity and efficiency.

It is an object of the present invention to provide an improved pump stock structure for an air pump used in a fish bowl by forming the pump cell and the air chambers that constitute the two major parts of an air pump in an inseparable one-piece structure to completely eliminate the above mentioned defects which found in prior art air pumps.

Another object of the present invention is to provide a method of manufacturing an air pump that would save so much costs in die-making process, assembly labours and working time that the economic benefit of the air pump and the competitive ability of which after being commercialized all can be greatly increased.

Still another object of the present invention is to provide an air pump for fish bowl, the pump stock of which has a flange at the bottom and can be placed into a recess of the pump casing so that the pump stock will not detach from its original position after long term use under the vibration generated during its operation.

A further important object of the present invention is to provide a much simplified design in the partition of air circulating passage which will greatly improve the air circulation and discharge efficiency.

BRIEF DESCRIPTION OF THE DRAWINGS

A specific embodiment of the invention will now be described with reference to the accompanying drawings of which:

FIG. 4A is a three-dimensional cross sectional, the plane of which is indicated by the lines C—C of FIG. 2.

DETAILED DESCRIPTION OF THE INVENTION

Figure 1:
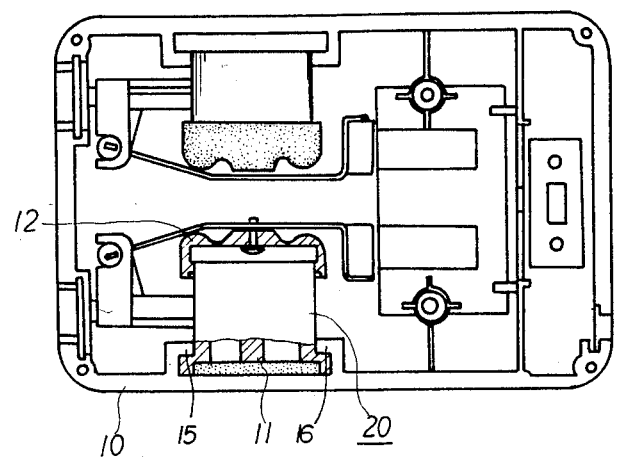
FIG. 1 is an elevational view showing the relative position of the present invention to the pump casing.
Figure 2:
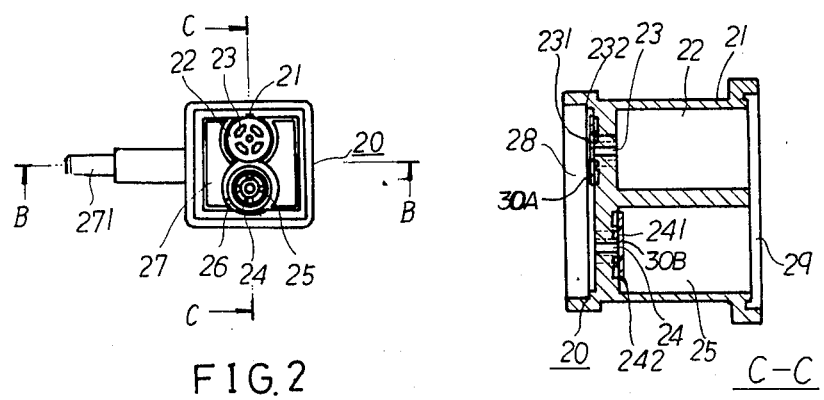
FIG. 2 is a bottom view of the present invention.
Figure 3:
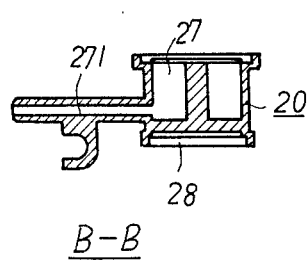
FIG. 3 is a cross section, the plane of which is indicated by the lines B—B of FIG. 2.
Figure 4:
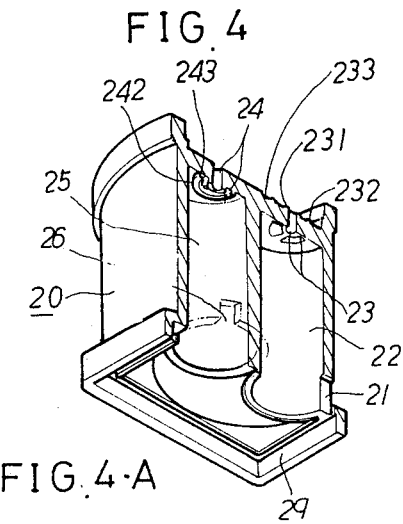
FIG. 4 is an enlarged cross section, the plane of which is indicated by the lines C—C of FIG. 2.

Referring to FIG. 1, a pump stock 20 having an one-piece body consisting of pump cell and air chambers is housed in a recess of the pump casing 10; a thin pump diaphragm 12 covers the top of the pump stock 20 and can deliver air to the pump cell 28 while it is shifted under the electromagnetic induction. Pump stock 20 is secured to the interior wall of casing 10 by disposing the base of pump stock 20 within a recess defined by opposed inwardly directed flanges 15 and 16 of casing 10.

As shown from FIG. 2 through FIG. 4A, the one-piece structured pump stock 20 mainly consists of an intake chamber 22, an intermediate air chamber 25, and a discharge chamber 27. The three chambers stand side by side and form a hollow cylindrical body. At the bottom of the side wall of the intake chamber 22, there is an intake port 21 for the incoming air to enter the intake chamber 22; on the top wall of the intake chamber 22, an opening is centered there and is partitioned by several ribs to form several incoming air passages 23 for the incoming air to pass through and enter the pump cell 28 located at the other side of the top of the intake chamber 22. Surrounding the upper surface of the incoming air passages 23 are a flange 231 and an outer projecting ring 232, thereupon a cap-shaped diaphragm 30A is tightly covered so that its outer edge may be lifted up by the air when it upwardly flows through the air passages 23 and thus form an one-way flow of the incoming air which will never flow in reverse down into the intake chamber 22 after it has flown into the pump cell 28.

The intermediate air chamber 25 at the other side also has a discharge port 26 formed at an adequate position near the bottom of its side wall for the outgoing air to flow from the intermediate air chamber 25 to the outer discharge chamber 27 and then flow out through the discharge pipe 271. Again, at the top wall of the intermediate air chamber 25, an opening is centered and partitioned by several ribs 243 to form several outgoing air passages 24. Surrounding the downside of the outgoing air passage 24 are a flange 241 and an outer projecting ring 242, thereupon a cap-shaped diaphragm 30B is tightly covered so that the air may only flow from the pump cell 28 into the intermediate air chamber 25 without any reverse flow.

A recess 29 is formed under the bottom of the pump stock 20 with a rubber cushion 11 stuffed therein (as shown in FIG. 1); and a thin pump diaphragm 12 is covered on the top of the pump stock to constitute a complete pump structure with one-way air delivery function.

I claim:

1. An improved air pump assembly for a fish bowl comprising:
   (a) a pump casing having an interior wall and provided with a first recess defined by opposed inwardly directed flanges; and
   (b) a one-piece pump stock including a base portion configured for disposition within the first recess to securely attach the pump stock to the interior wall of the casing, a second recess formed in the base portion, a rubber cushion disposed within the second recess, a pump cell disposed opposite the base portion, a pump diaphragm enclosing the pump cell, an intake chamber, an intermediate air chamber, and a discharge chamber, which chambers are disposed adjacent each other and collectively define a hollow cylindrical body, the intake and intermediate chambers being each provided with an air passage for communicating with the common pump cell, the air passage of the intake chamber on the side of the pump cell being defined by a first projecting ring for receiving a first cap-shaped diaphragm therein, and the air passage of the intermediate cell on the side of the intermediate chamber being partially defined by a second projecting ring for receiving a second cap-shaped diaphragm therein, which diaphragms define one-way valves for controlling air flow in a direction from the intake chamber through the pump cell and into the intermediate chamber.

2. The pump assembly of claim 1 wherein the pump cell is defined by an outwardly extending peripheral flange and the pump diaphragm encloses the peripheral flange.

* * * * *